May 11, 1937.  S. D. BUTTERWORTH  2,079,931
CAR LOADING DEVICE
Filed July 29, 1933
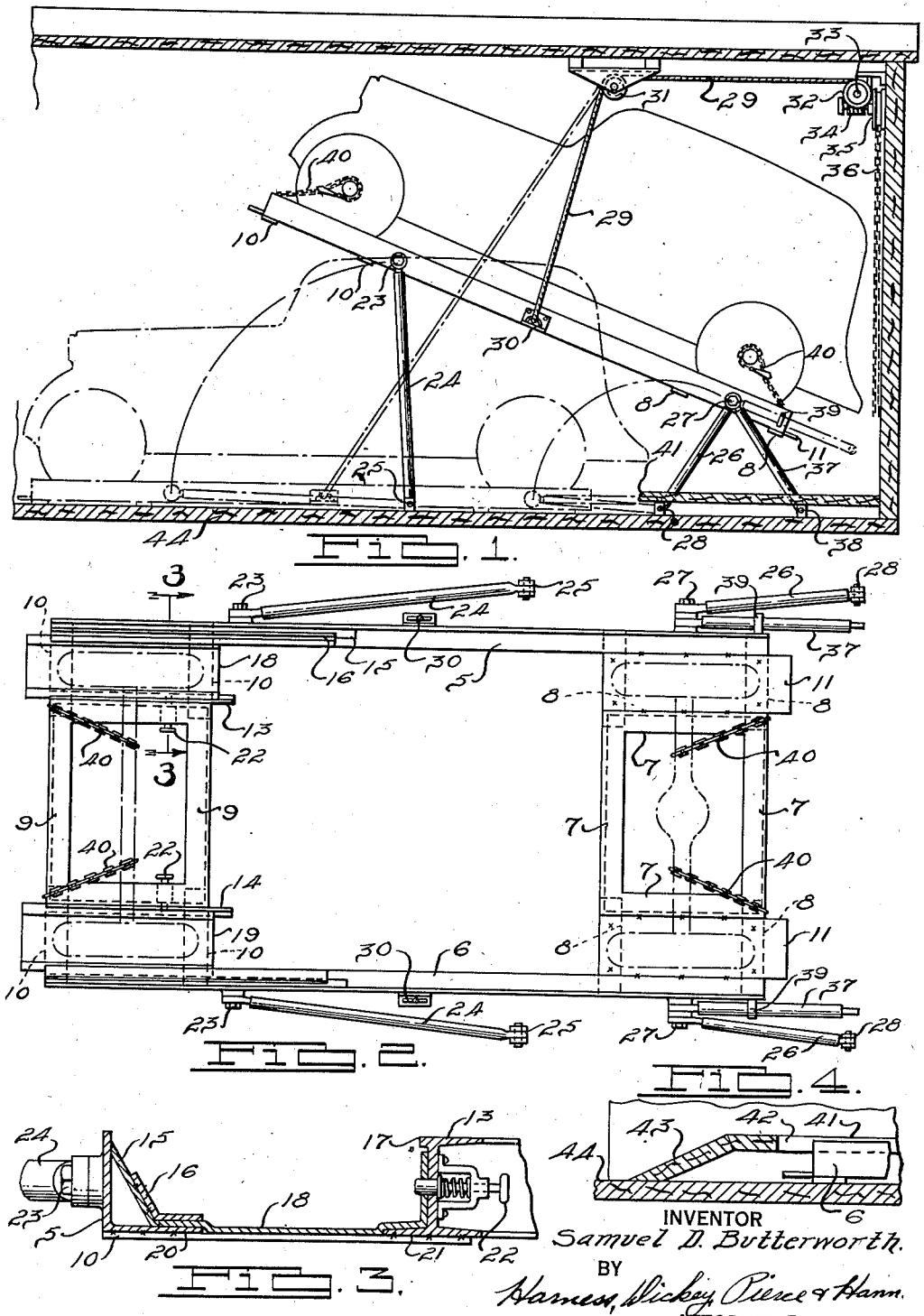
INVENTOR
Samuel D. Butterworth.
BY
Harness, Dickey, Pierce & Hann.
ATTORNEYS.

Patented May 11, 1937

2,079,931

UNITED STATES PATENT OFFICE 2,079,931

CAR LOADING DEVICE

Samuel D. Butterworth, Detroit, Mich., assignor, by mesne assignments, of ninety-nine per cent to The Worth Company, a corporation of Mich.

Application July 29, 1933, Serial No. 682,742

13 Claims. (Cl. 105—368)

This invention relates to car loading device and in particular to a mechanism for disposing an automobile or other object in a semi-decked position, along with other automobiles or other objects, for transportation in a freight car, a truck or the like.

One object of the invention is to provide a mechanism which will both raise an automobile, or other object, from a position on the floor of a freight car into a semi-decked position, that is, a position sufficiently above the floor to allow another automobile or other object to be placed beneath at least a part of the raised automobile, and retain the raised automobile in that elevated position and prevent it from being bumped or otherwise injuriously affected by the shocks resulting from the movement of the freight car.

Another object of the invention is to provide a semi-decking mechanism which will eliminate the necessity of removing any of the parts of the automobile in order to provide the necessary clearance, and which can be adapted to automobiles of different wheelbase, size, or make while still permitting the maximum space for storing an automobile beneath the frame.

Another object of the invention is to provide a mechanism which affords a more compact loading of automobiles in freight cars by reason of a more efficient use of the storage space in the end zones of the cars.

Another object of the invention is to provide a semi-decking mechanism easily mountable on all freight cars and which, when mounted will not detract from the utility of the freight car when used for purposes other than transporting automobiles.

Another object of the invention is to provide a semi-decking mechanism which can be quickly operated by one or two inexperienced men and with a minimum of manual labor.

Another object is to provide a semi-decking mechanism which, once the automobile is decked, will place no load on the roof of the car.

The invention will be better understood by the following description with reference to the illustrative embodiment of the invention shown in the accompanying drawing which forms part of the specification.

Fig. 1 is a fragmentary longitudinal vertical sectional view of a freight car illustrating an automobile loading mechanism constructed according to one form of the invention together with an automobile attached thereto. The dotted outline shows the frame in the loading position with an automobile attached thereto and ready to be decked. The full outline shows the frame and the same automobile raised to a semi-decked position.

Fig. 2 is a plan view showing, on a scale slightly larger than in Fig. 1, the improved frame together with the linkage which swings the frame from the floor to the semi-decked position.

Fig. 3 is an enlarged sectional view of a corner of the frame along the line 3—3 of Fig. 2 looking in the direction indicated by the arrows, illustrating the construction of the slidable front pans which adapt the frame to automobiles of different wheelbase.

Fig. 4 is a longitudinal vertical sectional view of a modified floor construction near the side door of the freight car illustrating a false flooring with recesses adapted to receive the frame and tapering to the true floor near the center of the freight car.

Referring to Fig. 2, a rectangular frame with a large open central portion is constructed by welding together standard sections of rolled steel. The side members 5 and 6 of the frame are formed from angle irons, as shown in section in Fig. 3. These side members are connected at the rear ends to a small rectangular structure constructed of welded channel irons 7 by means of short plates 8 which are welded at one end to the bottom of the side members 5 and 6 and at the other end to corners of the rectangular structure. The short plates 8 in conjunction with the side members 5 and 6 and the channels 7 are welded to, and fixedly support at each rear corner of the frame, short pans 11 suitable for receiving one pair of vehicle wheels.

The front ends of the side members 5 and 6 are similarly interconnected by a small rectangular structure composed of channels 9 transverse to the frame and I-beams 13 and 14 longitudinal to the frame. Short plates 10 are welded at one end to the side members 5 and 6 and at the other end to the corners of the small rectangular structure.

The I-beam 13 and the side member 5 support a pan 18 slidable longitudinally of the frame. This construction is better shown in Fig. 3. The side member 5 in its front portion is reinforced by a plate 15 extending longitudinally in the angle but leaving exposed a portion 20 of the horizontal face of the side member. The upper flange of the I-beam 13 is partially removed on the side facing the side member 5 leaving only a shoulder 17. The pan 18 is slidably supported by the lower flange 21 of I-beam 13 and the exposed portion 20 of side member 5. The inner side of pan 18 which rests on the flange 21 is bent upwardly and follows the contour of the web of I-beam 13. The pan 18 is guided in its travel at the inner side by the shoulder 17, and at the outer side by an angle plate 16 connected to the reinforcing plate 15 and extending over the outer edge of the pan 18. Pan 19 is slidably mounted on the other side of the frame in a similar manner.

The pans 18 and 19 are about the same length as the I-beams 13 and 14, and for mounting an automobile of long wheelbase, are slid in a forward position as shown in Fig. 2. However, the pans may be slidably moved longitudinally and rearwardly of the frame, sufficiently to accommodate an automobile of smaller wheelbase. In such a position, while the rear inner corners of the pans will not be supported, the support for the other parts of the pan is sufficient to take care of loads thereon, especially in view of the fact that automobiles of small wheelbase are usually much lighter than others.

For holding the pans 18 and 19 in any position, spring pressed pins 22 may be employed which are adapted to project through openings in the webs of I-beams 13 and 14 and selectively engage longitudinally spaced openings in the vertical sides of the pans 18 and 19.

When the automobile to be decked is positioned on the frame with its wheels on the pans, it is secured to the frame by means of suitable fastenings such as chains 40 secured to opposite ends of the frame and adapted to be secured to opposite ends of each of the axles of the automobile.

The frame is swingably connected to the floor by means of two link structures one at each end as follows. The forward end of the frame is pivotally connected at points 23 to a pair of rods 24 disposed at opposite sides of the frame. These rods 24 are pivotally connected at their other ends to the floor of the car at points 25 and act as one link structure in swingably connecting the front end of the frame to the floor. The rear portion of the frame is similarly pivoted at points 27 to a second link structure comprising a similar pair of rods 26 which are pivoted to the floor at points 28.

The pivotal points and the length of the elements in this linkage are so related that the frame may in an initial position,—the loading position shown in Fig. 1, in dotted outline,—be swung to the floor, resting on it and substantially parallel to it. The rods 26 are somewhat shorter than the rods 24, so that as the frame is swung upward and rearward, this difference in length causes the frame to incline toward the rear of the car and assume a secondary or semi-decked position shown in Fig. 1 in full outline.

For raising and tilting the frame to this semi-decked position, cables 29 are provided at each side of the freight car and such cables are connected to opposite sides of the frame at points 30. The cables in turn extend upwardly, are trained over pulleys 31 supported by the roof of the car, and then extend horizontally to points adjacent to the upper corners of the car where they are wound around rotary drums 32 mounted on a rotary shaft 33 transverse to the car. This shaft has a worm wheel (not shown) which engages with a worm 34 and the worm shaft (not shown) is provided with a sprocket wheel 35 about which an endless chain 36 is trained. This chain extends down along the end wall of the freight car to a point convenient for manual operation.

Thus, by manipulating the chain, the frame may be raised from the loading position on the floor to the semi-decked position inclined to and spaced from the floor, and, owing to the gear reduction, it may be raised with an automobile thereon by manual manipulation without excessive effort. The points 30 where the lifting force is applied to the frame are approximately at the center of the side members 5 and 6 so that each end of the frame will begin to rise simultaneously with, rather than attempt to pivot about, the other. The cables 29 incline upwardly and to the rear of the car so that a component of the lifting force will always be in the direction of swing of the points 30.

Once the frame is raised to this position it is desirable that it be maintained there by means more rigid than the cables 29 and better able to withstand the shocks of transportation. For this reason, a third link structure is provided, comprising a third pair of rods 37 pivoted to the frame at 27. A pair of spring clips 39 are provided one on each side of the rear part of the frame and positioned so that the rods 37, when not in use, may be swung up and engaged therein. These spring clips hold the rods 37 substantially parallel to the frame so that when the frame is on the floor the rods do not project upwardly.

When it is desired to fasten the frame rigidly in the semi-decked position, the frame is raised to this position by means of the cable 29 as described before. The rods 37 are then disengaged from their clips 39 and swung to the floor. The lower ends of the rods 37 are then suitably fastened to the floor at points 38 positioned rearwardly of points 28 so that the rods 26 and 37 form two A braces one on each side of the rear end of the frame. The cable, if desired, may then be loosened so that the full weight of the frame and automobile may be transmitted to the floor of the freight car by the rods 24, 26 and 37.

With the frame and automobile in the semi-decked position there is a considerable space below the frame, particularly the front portion. This space is large enough to allow another car to be rolled, radiator end first, until it is partly underneath the frame and the previously decked automobile. Portions of the second automobile may project up through the central opening of the frame, the slidable front pans 18 and 19 making it possible to keep this opening as large as possible considering the wheelbase of the decked automobile.

The operation of the device is as follows. The frame is first placed in the loading position. The automobile to be decked is rolled onto the frame so that the wheels are supported by the pans 11, 18 and 19, the latter two having been adjusted according to the wheelbase of the automobile. The automobile is then secured to the frame by means of the chains 40. The frame together with the automobile secured thereto is swung to the semi-decked position by manipulating the chain 36 as described before. The rods 37 are detached from their clips 39 and swung down to the floor to which they are then fastened. The tension on cable 29 is then released.

A second automobile having been loaded in the freight car, preferably facing the decking mechanism, is rolled underneath the frame and between the rods 24 as far as safe clearance will permit and in that position fastened by suitable means, to the floor of the freight car. Although when an automobile of small wheelbase is decked less open space within the frame is available for a second automobile because the pans 19 and 18 have been moved rearwardly, an automobile of the same wheelbase as that in decked position will nevertheless be able to lie under a great part of the frame because of the smaller height and other dimensions which will usually accompany a small wheelbase. With the two ends of a freight car equipped with devices such as this it is possible to load the freight car with one or two more automobiles due to more advantageous and compact loading at the ends of the car.

This process is reversed to remove the decked automobile. In order that the frame will by its own weight swing down to the loading position, the members of the linkage should be so proportioned that the frame and the car, whether in decked or in loading position, are always on the same side of the position of unstable equilibrium, otherwise the frame when lowered from the decked position, instead of swinging forward to the loading position, will swing back in the opposite direction.

Where it is desired to use the freight car in transporting other articles with which semi-decking would not be advantageous, the frame is lowered until it rests on the floor in its loading position. The cables 29 are detached from the frame at 30 and are raised to the roof of the car or otherwise placed out of the way.

If it is desired, the floor of the freight car may be provided with recesses to receive the frame and rods so that the mechanism in its loading position will be flush with the top of the floor and will not interfere when the car is used for other purposes. This result is herein obtained by building, as shown in Fig. 4, in each end of the car a false flooring 41 of a height equal to the thickness of the frame and provided with slots 42 to receive the frame and rods in the loading position. This false flooring may taper at 43 to the true floor 44 of the car near the exit thereof so as not to change the level of the doorsills which are usually the same height as the loading platforms in the freight yards. The false flooring will not detract from the the space available to the second automobile since the wheels thereof will fit in the slots 42.

While the invention is described above in connection with freight cars and is particularly adapted for such use, it is apparent that the means for elevating and supporting the automobile is also adapted for use in any other type of storage compartment whether stationary or in a freight conveyance. For example, this invention may be used in motor trucks, ships, garages, or any other place where it is necessary to conserve floor space. Accordingly, it will be understood that in the following claims, the expressions "freight car", "car", etc. may be construed to cover any storage compartment. It is apparent, further, that other changes may be made in the specific embodiment disclosed without departing from the spirit of the invention as claimed herein.

I claim:

1. In combination with a freight car or the like, a frame normally resting near the floor of said car in a loading position, a link structure connecting said frame near one end to the floor of the freight car and restricting the motion of the frame near said end to a circular path in a vertical plane, a second link structure connecting the frame near the other end to the car and restricting the motion of the frame near said other end to a second circular path in a vertical plane, said link structures being pivotally connected at their respective points of connection and so disposed and proportioned as to allow the frame to swing upwardly from the floor to a secondary position nearer the top of the car, the ends of said frame each describing their respective circular paths, means to swing the frame to said secondary position, and means to retain the frame in said secondary position.

2. In combination with a freight car or the like, a frame normally resting on the floor of said car in a loading position, a link structure connecting said frame near one end to the floor of the freight car and restricting the motion of the frame near said end to a circular part in a vertical plane, a second link structure connecting the frame near the other end to the floor of the freight car and restricting the motion of the frame near said other end to a second circular path in a vertical plane, said link structures being pivotally connected at their respective points of connection and so disposed and proportioned as to allow the frame to swing upwardly from the floor to a secondary position nearer the top of the car, the ends of said frame each describing their respective circular paths, means to swing the frame to said secondary position, and means to retain the frame in said secondary position.

3. In combination with a freight car or the like, a frame normally resting on the floor of said car in a loading position, a link structure connecting said frame near one end to the floor of the freight car and restricting the motion of the frame near said end to a circular path in a vertical plane, a second link structure connecting the frame near the other end to the car and restricting the motion of the frame near said other end to a second circular path in a vertical plane, said link structures being so disposed and proportioned as to allow the frame to swing upwardly from the floor to a secondary position nearer the top of the car and inclined with the horizontal, the ends of said frame each describing their respective circular paths, said link structures being different in length so as to cause said frame during said upward swing to be simultaneously angularly displaced, means to swing the frame to said secondary position, and means to retain the frame in said secondary position.

4. In combination with a freight car or the like, a frame normally resting on the floor of said car in a loading position, a link structure connecting said frame near one end to the floor of the freight car and restricting the motion of the frame near that end to a circular path in a vertical plane, a second link structure connecting the frame near the other end to the floor of the car and restricting the motion of the frame near said other end to a second circular path in a vertical plane, said link structures being so disposed and proportioned as to allow the frame to swing upwardly from the floor to a secondary position vertically spaced from the floor and inclined thereto, said link structures being of different lengths so as to cause said frame during said upward swing to be simultaneously angularly displaced, means to swing the frame to said secondary position, an anchor member detachably connecting the car and the frame while in said secondary position and adapted to retain the frame in said secondary position.

5. In combination with a freight car or the like, a frame normally resting on the floor of said car in a loading position, a link structure connecting said frame near one end to the floor of the freight car and restricting the motion of the frame near said end to a circular path in a vertical plane, a second link structure connecting the frame near the other end to the floor of the car and restricting the motion of the frame near said other end to a second circular path in a vertical plane, said link structures being so disposed and proportioned as to allow the frame to swing upwardly from the floor to a secondary position vertically spaced from the floor and inclined thereto, said link structure being of different lengths so as to cause said frame during said upward swing to be simultaneously angularly displaced, means to swing the frame to said secondary position, a third link structure connected at one end to said other end of the frame, and adapted to be fixedly connected to the floor in angular relation with said second link structure when the frame is in said secondary position.

6. In combination with a freight car or the like, a frame normally resting on the floor of said car in a loading position, a link structure connecting said frame near one end to the floor of the freight car and restricting the motion of the frame near said end to a circular path in a vertical plane, a second link structure connecting the frame near the other end to the floor of the car and restricting the motion of the frame near said other end to a second circular path in a vertical plane, said link structures being so disposed and proportioned as to allow the frame to swing upwardly from the floor to a secondary position vertically spaced from the floor and inclined thereto, said link structures being of different lengths so as to cause said frame during said upward swing to be simultaneously angularly displaced, means to swing the frame to said secondary position, means to retain said frame in said secondary position, and the floor of said car having recesses adapted to receive said frame and link members.

7. In combination with a freight car or the like, a frame normally resting on the floor of said car in a loading position, a link structure connecting said frame near one end to the floor of the freight car and restricting the motion of the frame near said end to a circular path in a vertical plane, a second link structure connecting the frame near the other end to the floor of the car and restricting the motion of the frame near said other end to a second circular path in a vertical plane, said link structure being so disposed and proportioned as to allow the frame to swing upwardly from the floor to a secondary position vertically spaced from the floor and inclined thereto, said link structures being of different lengths so as to cause said frame during said upward swing to be simultaneously angularly displaced, means to swing the frame to said secondary position, means to retain said frame in said secondary position, a false floor laid above the floor of said car, said false floor having vertical slots adapted to receive the frame and link members, and said false flooring sloping downward to the true floor beyond said slotted portion.

8. In combination with a freight car having a floor, a longitudinally extending frame disposed on said floor for bodily supporting a longitudinally extending automobile thereon, means for supporting said frame relative to the floor and comprising links pivotally connected respectively to said frame at points adjacent the ends thereof and pivotally connected to the floor at points longitudinally spaced from said ends, said links being of different lengths and being arranged to automatically direct the frame into a longitudinally inclined position when the frame is moved bodily upward, means for lifting the entire frame from the floor to said inclined position, and means for securing said frame in said inclined position.

9. In combination with a freight car having a floor therein, means for engaging and supporting a longitudinally extending automobile in the car, link means connecting said automobile engaging and supporting means to the freight car adjacent the floor thereof and so constructed and arranged that the entire automobile supported thereby is guided for movement in a fixed and longitudinally and upwardly extending path from a position adjacent and substantially parallel to the floor to an elevated decking position in which both ends of the automobile are raised above the floor, and means for effecting such movement of the supporting means and the automobile.

10. In combination with a freight car having a floor therein, means for engaging and supporting a longitudinally extending automobile in the car, link means connecting said automobile engaging and supporting means to the freight car adjacent the floor thereof and so constructed and arranged that the entire automobile supported thereby is guided for movement in a fixed and longitudinally and upwardly extending path and is given a combined rectilinear and rotary movement from a position adjacent and substantially parallel to the floor to an elevated semi-decking position in which the automobile is longitudinally inclined and both ends thereof are raised above the floor, and means for effecting such movement of the supporting means and the automobile.

11. In combination with a freight car having a floor therein, a longitudinally extending frame for supporting a longitudinally extending automobile thereon, means connecting said frame to the car adjacent the floor thereof and so constructed and arranged that said entire frame is supported and guided for movement in a fixed and longitudinally and upwardly extending path from a position adjacent and substantially parallel to the floor to an elevated decking position in which both ends of the frame are raised above the floor, and means for raising said frame along said path.

12. In combination with a freight car having a floor therein, a longitudinally extending frame for supporting a longitudinally extending automobile thereon, link means adjacent each end of said frame connecting said frame to the car adjacent the floor thereof and so constructed and arranged that said entire frame is supported and guided for movement in a fixed and longitudinally and upwardly extending path and is given a combined rotary and rectilinear movement from a position adjacent and substantially parallel to the floor to an elevated semi-decking position wherein the frame is longitudinally inclined and both ends thereof are elevated above the floor, means for raising said frame in the path defined by said link means, and means for fixing said frame in its elevated position.

13. In combination with a freight car having a floor therein, a longitudinally extending frame for bodily supporting a longitudinally extending automobile thereon, pivotal strut means including a strut at each end of the frame pivotally connected to said end of the frame and to said car adjacent the floor thereof, the difference between the spacing longitudinally along said frame of the points of connection of said struts with the frame and the longitudinal spacing of the points of connection of the struts with the car being equal to the difference between the lengths of the struts, whereby said struts will support and guide said frame for movement in a fixed path from a position wherein the frame is substantially parallel to and adjacent the floor of the car to a position wherein both ends of the frame are elevated above the floor, and means for raising said frame in the path defined by said strut means.

SAMUEL D. BUTTERWORTH.